(12) United States Patent
Komura et al.

(10) Patent No.: US 9,739,927 B2
(45) Date of Patent: Aug. 22, 2017

(54) LIGHT SOURCE DEVICE AND DISPLAY APPARATUS

(71) Applicant: Sakai Display Products Corporation, Sakai-shi, Osaka (JP)

(72) Inventors: Atsushi Komura, Sakai (JP); Yoshitake Ishimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/894,762

(22) PCT Filed: May 23, 2014

(86) PCT No.: PCT/JP2014/063727
§ 371 (c)(1),
(2) Date: Nov. 30, 2015

(87) PCT Pub. No.: WO2014/192659
PCT Pub. Date: Dec. 4, 2014

(65) Prior Publication Data
US 2016/0109644 A1    Apr. 21, 2016

(30) Foreign Application Priority Data
May 28, 2013  (JP) ................................. 2013-112247

(51) Int. Cl.
*F21V 8/00*  (2006.01)

(52) U.S. Cl.
CPC ......... *G02B 6/0061* (2013.01); *G02B 6/0036* (2013.01); *G02B 6/0041* (2013.01); *G02B 6/0055* (2013.01)

(58) Field of Classification Search
CPC .. G02B 6/0061; G02B 6/0036; G02B 6/0041; G02B 6/0055
See application file for complete search history.

(56) References Cited

U.S. PATENT DOCUMENTS 8,899,813 B2 * 12/2014 McCollum .............. G09F 13/02
                                                     362/612
8,909,009 B2 * 12/2014 Lee ...................... G02B 6/0036
                                                     385/129

(Continued)

FOREIGN PATENT DOCUMENTS

CN  WO 2013149546 A1 * 10/2013 .......... G02B 6/0021
JP      2012-089304 A      5/2012

(Continued)

*Primary Examiner* — Mary Ellen Bowman
(74) *Attorney, Agent, or Firm* — Bret E. Field; Bozicevic, Field & Francis LLP

(57) ABSTRACT

Provided are a light source device capable of effectively coping with a luminance change in a light guide plate caused by a variation in an interval between a light source and the light guide plate at a low cost, and a display apparatus. A light source device which includes a light guide plate for emitting light made incident on one side surface from one surface thereof, is configured so as to, for the luminance change due to a change in an interval between a light source disposed on the one side surface side of the light guide plate and the light guide plate, previously increase only an average luminance of the light source side (one side surface side) in which an influence of the luminance change is largest.

5 Claims, 6 Drawing Sheets

(56) References Cited

U.S. PATENT DOCUMENTS

| | | | | |
|---|---|---|---|---|
| 8,911,133 B2* | 12/2014 | Sato | ................... | G02B 6/0061 |
| | | | | 362/607 |
| 8,998,474 B2* | 4/2015 | Nishitani | ............. | G02B 6/0051 |
| | | | | 362/259 |
| 9,322,977 B2* | 4/2016 | Kuo | ................... | G02B 6/0036 |
| 9,411,085 B2* | 8/2016 | Iwasaki | ................ | G02B 6/0011 |
| 2012/0257137 A1 | 10/2012 | Nitanai | | |
| 2013/0070477 A1 | 3/2013 | Yamada et al. | | |

FOREIGN PATENT DOCUMENTS

| | | | | |
|---|---|---|---|---|
| JP | 2012-220755 A | 11/2012 | | |
| JP | 2013-004267 A | 1/2013 | | |
| JP | 2013-069498 A | 4/2013 | | |
| JP | WO 2015029639 A1 * | 3/2015 | ....... | G02F 1/133606 |

* cited by examiner

LIGHT SOURCE DEVICE AND DISPLAY APPARATUS

This application is the national phase under 35 U.S.C. §371 of PCT International Application No. PCT/JP2014/063727 which has an International filing date of May 23, 2014 and designated the United States of America.

TECHNICAL FIELD

The present invention relates to a light source device including a light guide plate which emits light made incident on one side surface from one surface thereof, and a display apparatus including the light source device.

DESCRIPTION OF RELATED ART

In general, a so-called edge light type light source device which irradiates a liquid crystal panel with light from a side surface side thereof generally includes, on a rear surface side of the liquid crystal panel, a light guide plate which guides light from a light source to the liquid crystal panel, and a reflection sheet which reflects the light made incident on the light guide plate from the light source to the liquid crystal panel side.

However, when so-called rattling occurs due to an increase in a size of the liquid crystal panel, a variation in a design, or the like, positions of the light source and the light guide plate are not constant, such that a luminance distribution in the light guide plate and the liquid crystal panel is also changed.

FIGS. 6A and 6B are explanatory views illustrating, when the variation in the positions of the conventional light source and the light guide plate occurs, a change in the luminance distribution in the light guide plate. FIG. 6A is an explanatory view illustrating, when an LED light source L and a light guide plate G are located at a normal position as designed in the related art, an incidence of light from the light source L, and FIG. 6B is an explanatory view illustrating, when the LED light source L and the light guide plate G are apart from each other farther than the design in the related art, the incidence of light from the light source L.

As illustrated in FIG. 6, in the light guide plate G, a portion of the light source L side is greatly affected by the light of A regions (0° to 30°, and 150° to 180°), and a portion on a side opposite to the light source L is greatly affected by the light of a C region (60° to 120°). However, when the LED light source L and the light guide plate G are apart from each other farther than the design, that is, when an interval between the light source L and the light guide plate G is wide, among the light emitted from the light source L, a part of the light of the A regions and the light of B regions (30° to 60°, and 120° to 150°) cannot be made incident on the light guide plate G, and thereby the luminance of the portion on the light source L side of the light guide plate G is greatly decreased.

In other words, due to the variation in the interval between the light source L and the light guide plate G, a luminance change of the portion on the light source L side of the light guide plate G is increased.

For the above-described problem, Japanese Patent Application Laid-Open Publication Number 2012-220755 discloses a liquid crystal display apparatus in which a substrate having light emitting elements mounted on a mounting surface thereof is attached to an attaching part provided in a light guide plate, such that, even when the light guide plate is deformed or varied in a position for some reason, the substrate attached to the attaching part of the light guide plate is deformed following the deformation of the light guide plate, and therefore, it is possible to suppress a change in the relative position (a change in a positional relation) between the light emitting elements mounted on the mounting surface of the substrate and a light incident surface of the light guide plate, thus to suppress a decrease in the luminance of the light guided to the liquid crystal panel and an occurrence of an unevenness in the luminance.

SUMMARY

However, the liquid crystal display apparatus of Japanese Patent Application Laid-Open Publication Number 2012-220755 as described above has a problem that it is necessary to separately provide the attaching part in the light guide plate, and attach the light source to the attaching part, such that a configuration of the apparatus is complicated, and manufacturing costs are increased.

In consideration of the above-mentioned circumstances, it is an object of the present invention to provide a light source device including a light guide plate which emits light made incident on one side surface from one surface thereof, and is configured so as to, for the luminance change due to a change in an interval between the light source to be disposed on one side surface side of the light guide plate and the light guide plate, previously increase only an average luminance of a light source side (one side surface side) in which such a luminance change is largest, and thereby it is possible to effectively cope with the luminance change in the light guide plate caused by the above-described variation in the interval between the light source and the light guide plate at a low cost, and a display apparatus including the light source device.

According to one aspect of the present invention, there is provided a light source device which includes a light guide plate configured to emit light made incident on one side surface from one surface thereof, wherein the light guide plate may be configured so that an average luminance of the one side surface side is higher than the average luminance of the other side surface side, the other side surface opposite to the one side surface, with respect to a center between the one side surface and the other side surface in an opposite direction thereof.

According to the present invention, the light guide plate is configured so as to previously increase only the average luminance of the light source side (one side surface side) in which a luminance change caused by a variation in an interval between the light source to be disposed on the one side surface of the light guide plate and the light guide plate is largest, thus to cope with the luminance change in the light guide plate due to a change in the interval between the light source and the light guide plate.

In the light source device according to the present invention, the light guide plate may be configured to have an average luminance $Yn$ of the one side surface side and an average luminance $Yf$ of the other side surface side which satisfy a relation of Formula 1 below:

$$1.1Yf < Yn < 1.5Yf \tag{1}$$

According to the present invention, when configuring the light guide plate so as to previously increase only the average luminance of the light source side (one side surface side), the average luminance $Yn$ of the one side surface side and the average luminance $Yf$ of the other side surface side are set so as to satisfy the relation of $1.1Yf < Yn < 1.5Yf$.

In the light source device according to the present invention, the light guide plate may have reflection dots which are provided on the other surface thereof to irregularly reflect the light made incident thereon from the one side surface, and the reflection dots may be provided so that a ratio thereof on the other surface is larger at the one side surface side than the other side surface side, with respect to the center in the opposite direction.

According to the present invention, for example, the light guide plate is configured in such a manner that, the reflection dots are provided so that diameters thereof at the one side surface side are appropriately controlled to be more increased than the other side surface side, with respect to the center in the opposite direction, therefore a ratio of the reflection dots on the other surface is larger at the one side surface side than the other side surface side, and thereby to previously increase only the average luminance of the light source side (one side surface side).

The light source device according to the present invention may include a light source disposed on the one side surface side of the light guide plate, wherein an interval of 0.1 mm to 1.0 mm may be provided between the light source and the one side surface of the light guide plate.

According to the present invention, the light source device is configured to have an interval of 0.1 mm to 1.0 mm between the light source and the one side surface of the light guide plate in consideration of a collision, a dimensional accuracy, a accuracy of the assembly, and the like between the light guide plate due to an expansion and a deformation of the other members other than the light guide plate.

According to another aspect of the present invention, there is provided a display apparatus including: the light source device according to any one of the above-described inventions; and a display panel which is provided on one surface side of the light guide plate of the light source device, and configured to display an image on the display panel using light made incident on the display panel through the light guide plate.

According to the present invention, the light emitted from the light source of the light source device is made incident on the light guide plate of the light source device, and is emitted to the display panel through the one surface of the light guide plate. The display panel displays an image using the light.

According to the present invention, the light source device is configured so as to, for the luminance change due to the change in the interval between the light source to be disposed on the one side surface of the light guide plate and the light guide plate, previously increase only the average luminance of the light source side of the light guide plate in which the luminance change is largest, and thereby, as described above, it is possible to effectively cope with the luminance change in the light guide plate caused by the variation in the interval between the light source and the light guide plate at a low cost.

The above and further objects and features will move fully be apparent from the following detailed description with accompanying drawings.

BRIEF DESCRIPTION OF THE SEVERAL
VIEWS OF THE DRAWINGS

DETAILED DESCRIPTION

Hereinafter, an example in which a light source device and a display apparatus according to an embodiment of the present invention are applied to a television receiving apparatus having a so-called liquid crystal panel will be described in detail with reference to the accompanying drawings.

Figure 1:
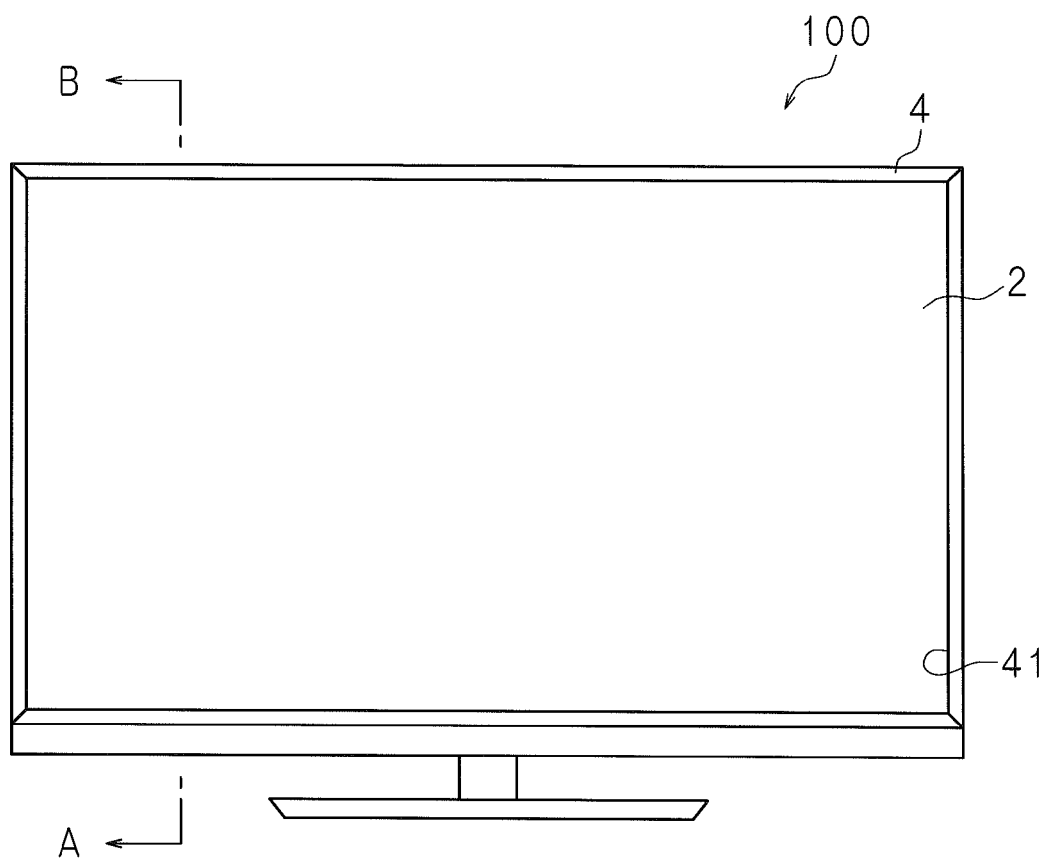
FIG. 1 is a front view illustrating an appearance of a television receiving apparatus according to an embodiment of the present invention.
Figure 2:
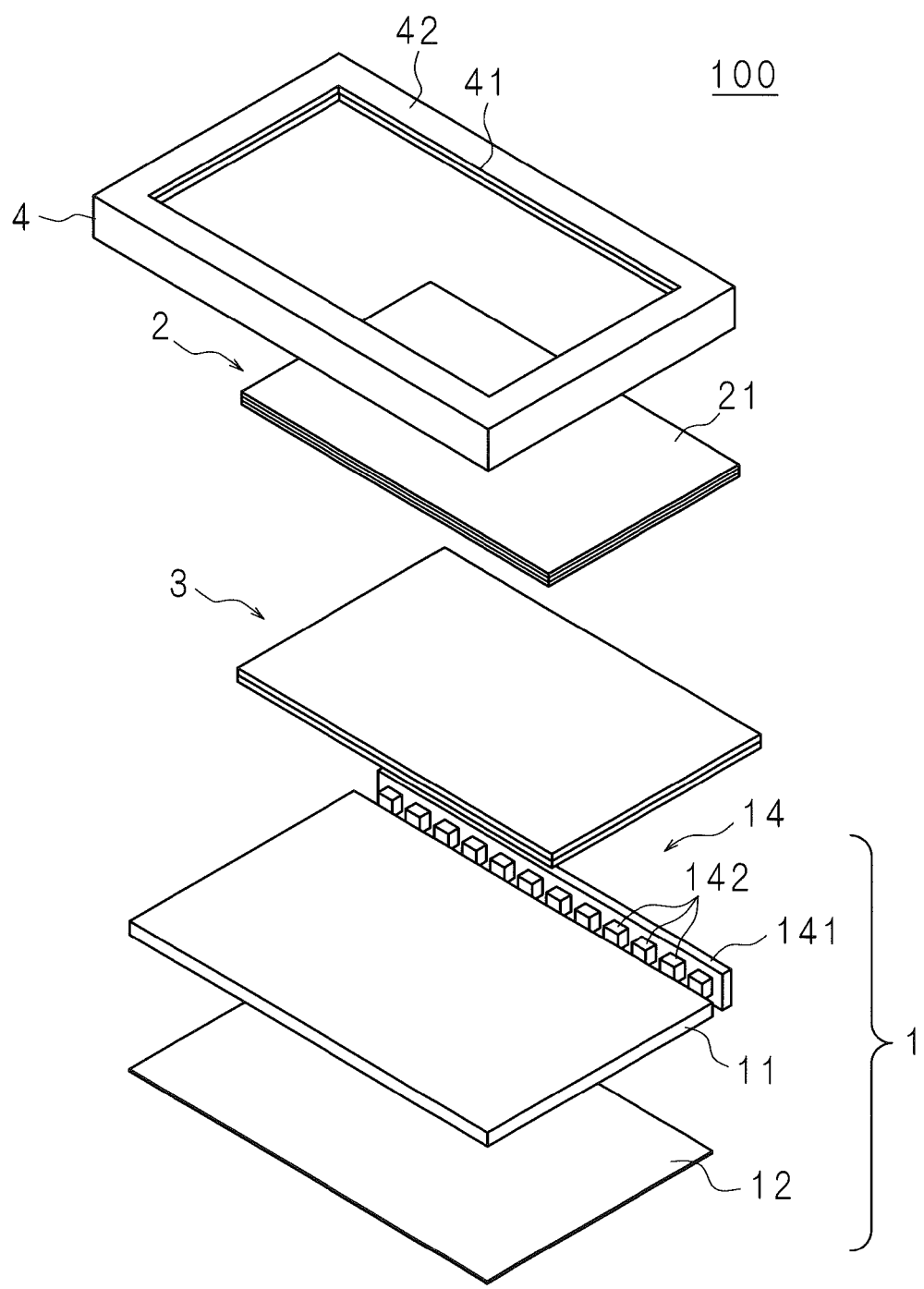
FIG. 2 is an exploded perspective view illustrating main components of the television receiving apparatus according to the embodiment of the present invention.
Figure 3:
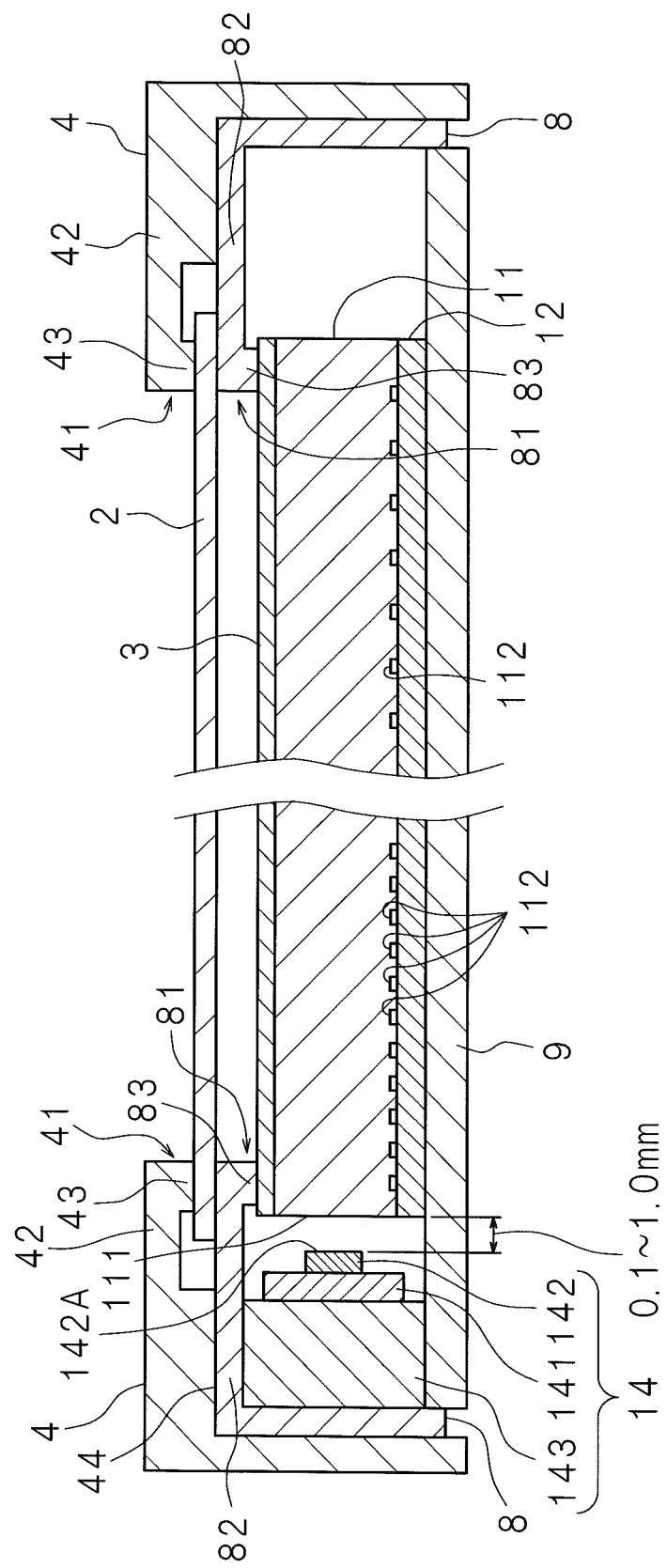
FIG. 3 is a longitudinal-sectional view taken on line A-B of FIG. 1.

FIG. 1 is a front view illustrating an appearance of the television receiving apparatus according to the embodiment of the present invention, FIG. 2 is an exploded perspective view illustrating main components of the television receiving apparatus according to the embodiment of the present invention, and FIG. 3 is a longitudinal-sectional view taken on line A-B of FIG. 1. In FIG. 1, a television receiving apparatus 100 according to the embodiment of the present invention is illustrated. Hereinafter, for the convenience of explanation, a horizontal direction and a vertical direction of the television receiving apparatus are referred to as a lateral direction and a longitudinal direction, respectively.

The television receiving apparatus 100 according to the embodiment of the present invention, as illustrated in FIG. 1, includes a rectangular liquid crystal display panel 2 which displays an image on one surface of a front side. In addition, an optical sheet 3 and a light source device 1 according to the present invention are disposed on a rear side of the liquid crystal display panel 2. The light source device 1 includes a light source unit 14, a light guide plate 11, and a reflection sheet 12.

The optical sheet 3 is disposed so that one surface thereof faces the other surface of the liquid crystal display panel 2, the light guide plate 11 is disposed so that one surface thereof faces the other surface of the optical sheet 3, and the reflection sheet 12 is disposed so that one surface thereof faces the other surface of the light guide plate 11.

A front cover 4 is disposed on the front side from the liquid crystal display panel 2. The front cover 4 is formed in a cylindrical shape having a rectangular bottom copying the shape of one surface 21 of the liquid crystal display panel 2 viewed from a user, and is formed in an L shape in a cross-sectional view. In addition, the front cover 4 has a rectangular display window 41 opened in the bottom thereof. The user may view an image displayed on the one surface 21 of the liquid crystal display panel 2 through the display window 41.

Further, portions between edges of the bottom of the front cover 4 and edges of the display window 41 have a prescribed width. In other words, in the bottom of the front cover 4, residual portions other than the display window 41 are formed as hollow rectangular frame part 42. Peripheral edge parts of the one surface 21 of the liquid crystal display panel 2 are covered with the frame part 42.

The hollow rectangular frame part 42 is provided with panel pressing part 43 which protrude in a thickness direction of the liquid crystal display panel 2 on a rear side of one end part of the display window 41 side, and abut the peripheral edge parts of the liquid crystal display panel 2 to push down the same. That is, the panel pressing part 43 holds the liquid crystal display panel 2 by pressing the peripheral edge parts of the liquid crystal display panel 2 to optical material holding frames 8 to be described below.

In addition, the liquid crystal display panel 2 is provided with a polarizing plate (not illustrated) on the other surface thereof, and is configured in such a manner that light made incident thereon by using the polarizing plate is separated into p-waves (horizontal polarizing component) and s-waves (vertical polarizing component), then only the p-waves are transmitted toward the one surface, and the s-waves are absorbed by the polarizing plate. The liquid crystal display panel 2 may be an electrophoresis liquid crystal panel, for example.

In addition, the frame part 42 are provided with abutting surfaces 44 which are formed with a prescribed level difference on a rear side of the other end part thereof, so as to abut the optical material holding frames 8. The liquid crystal display panel 2, the optical material holding frames 8, the optical sheet 3 and the light source device 1 are housed in the front cover 4.

The optical material holding frames 8 are provided on the other surface side of the liquid crystal display panel 2, which abut the peripheral edge parts of the other surface of the liquid crystal display panel 2 to support the liquid crystal display panel 2. As described above, the panel pressing part 43 presses the peripheral edge parts of the liquid crystal display panel 2 to the optical material holding frames 8 side, and the liquid crystal display panel 2 is pinched by the panel pressing part 43 and the optical material holding frames 8.

In addition, the optical material holding frames 8 are formed in a cylindrical shape having a rectangular bottom copying the shape of the bottom of the front cover 4, and are formed in an L shape in a cross-sectional view. Further, the optical material holding frames 8 have a rectangular opening 81 formed in the bottom thereof copying the display window 41.

In the bottom of the optical material holding frames 8, residual portions other than the opening 81 are formed as abutting parts 82 which abut the other surface of the liquid crystal display panel 2 and the abutting surfaces 44 of the front cover 4, and the abutting parts 82 are formed in a hollow rectangular shape.

The abutting parts 82 are provided with sheet holding parts 83 which are end parts thereof and protrude in the thickness direction of the optical sheet 3 on the rear side of one end part of the opening 81 side along edges thereof. The sheet holding parts 83 abut and push down the optical sheet 3 with the peripheral edge parts thereof, thus to hold the optical sheet 3, the light guide plate 11 and the reflection sheet 12. That is, the sheet holding parts 83 hold the optical sheet 3, the light guide plate 11 and the reflection sheet 12 by pressing the peripheral edge parts of the optical sheet 3 to a heat dissipation part 9 to be described below.

The optical sheet 3 is a publicly known sheet which functions to diffuse and collect, etc., light emitted from the light source unit 14 and made incident thereon through the light guide plate 11, so as to more uniformly emit light toward the liquid crystal display panel 2. For example, the optical sheet 3 includes two diffusion sheets, and one prism sheet, wherein the prism sheet is installed between the two diffusion sheets.

One diffusion sheet of the two diffusion sheets, which is disposed on the light guide plate 11 side, is an optical sheet which functions to diffuse light made incident thereon from the light source unit 14 through the light guide plate 11 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet perpendicular to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The rectangular light guide plate 11 is disposed on the other surface side of the optical sheet 3. The light guide plate 11 guides light emitted by the light source unit 14 to the optical sheet 3 (liquid crystal display panel 2). For example, the light guide plate 11 may be configured in such a manner that one surface thereof facing the other surface of the optical sheet 3 has an emitting surface on which a pattern is formed so that the light made incident thereon from the light source unit 14 advances toward the liquid crystal display panel 2. Thereby, the light guide plate 11 may convert the light made incident thereon from the light source unit 14 into flat light to uniformly transmit it to the optical sheet 3 through the emitting surface. The light guide plate 11 is made of a high transparency acrylic resin, for example.

In addition, the light guide plate 11 has a plurality of reflection dots 112 which are disposed on the other surface thereof for irregularly reflecting the light made incident thereon from the light source unit 14, and thereby emitting the incident light from the emitting surface of the light guide plate 11.

When the dot shape of the reflection dots 112 is made by, for example, ruggedness processing, an ink prepared by adding a light diffusing material such as silicon dioxide, silicates, aluminum oxide, or the like is used in some cases. When using the ink as described above, ink application by silk printing, printing by an ink jet, or the like is performed, and in the case of the roughness processing, concave surface manufacturing by laser processing, shaping by extruding, or the like is performed.

Light emitted from the light source unit 14 side is extracted to the reflection dots 112, 112, ..., 112 provided on the other surface of the light guide plate 11 to emit light, and any remaining light is extracted by the reflection dots 112, 112, ..., 112 formed in an advancing direction to emit light, and then the remaining light advances in the advancing direction, and is extracted by the other reflection dots 112, 112, ..., 112 to emit light, which are repeated.

That is, the reflection dots 112, 112, ..., 112 irregularly reflect the light made incident thereon from the light source unit 14. In this case, a part of the irregularly reflected light goes to the one surface (emitting surface) of the light guide plate 11, and the other part thereof goes to the reflection sheet 12 on the other surface side of the light guide plate 11, and then is reflected by the reflection sheet 12 to go to the one surface of the light guide plate 11. Thereby, surface emission on the one surface of the light guide plate 11 is performed.

Therefore, the luminance distribution in the light guide plate 11 may be specified depending on the distribution method of the reflection dots 112, 112, ..., 112 on the other surface of the light guide plate 11. In this regard, the light guide plate 11 of the television receiving apparatus 100 according to the present embodiment is configured in such a manner that a distribution density of the reflection dots 112, 112, ..., 112 is high at the light source unit 14 side.

In more detail, the light guide plate is configured in such a manner that, diameters of the reflection dots 112, 112, ..., 112 at the light source unit 14 side, with respect to a center of the light guide plate 11 in a short-side direction thereof are appropriately controlled, and a ratio occupied by the reflection dots 112, 112, ..., 112 at the light source unit 14 side on the other surface side of the light guide plate 11 is larger than the ratio occupied by the reflection dots 112, 112, ..., 112 at an opposite side far from the light source unit 14 (hereinafter, referred to as a far light source unit 14 side). Further, in the case of the diameter of the reflection dots 112, even when the average luminance at the light source unit 14 side and the far light source unit 14 side are the same as each other due to being affected by a light source 142, the number of the reflection dots 112 and the diameter of the reflection dots 112 are not always the same as each other. This is designed depending on a light source chassis. By the above-described configuration, as described below, it is possible to obtain the luminance distribution inherent in the present invention.

The light source unit 14 is provided near one side surface 111 on a lower side, which is the side surface of the light guide plate 11 in the longitudinal direction. The light source unit 14 has a strip-shaped substrate 141 oppositely disposed to the one side surface 111 of the light guide plate 11, a plurality of light sources 142, 142, ..., and 142 mounted on the substrate 141 in a long-side direction thereof, and a square column-shaped holding block 143 for holding the substrate 141 and the light sources 142, 142, ..., and 142.

The light source 142 may be, for example, a cold cathode fluorescent lamp (CCFL), external electrode fluorescent lamp (EEFL), hot cathode fluorescent lamp (HCFL), light emitting diode (LED) or the like.

In the light source 142, an interval of 0.1 mm to 1.0 mm, for example, is provided between a light emitting surface 142A for emitting light to the light guide plate 11 and the one side surface 111 of the light guide plate 11. By setting the interval between the light emitting surface 142A and the one side surface 111 of the light guide plate 11 to be 0.1 mm to 1.0 mm, the light guide plate 11 is configured in such a manner that only a movement of the light guide plate 11 to the light source 142 side is limited, while a free movement of the light guide plate 11 to the opposite side is allowed. Thereby, the light guide plate 11 is configured in such a manner that, when actually using the television receiving apparatus 100, it is possible to constantly hold the interval between the light emitting surface 142A of the light source 142 due to its own weight.

For example, as described above, the light guide plate 11 may be configured so as to limit the movement thereof to the light source 142 side, by pinching it with the sheet holding parts 83 and the heat dissipation part 9. Alternately, the movement of the light guide plate 11 to the light source 142 side may be limited, by providing a prescribed protrusion on the one side surface 111 side of the light guide plate 11.

In addition, by the above-described configuration, even when the light guide plate 11 is expanded by heat generated during using the television receiving apparatus 100, the expansion thereof to the up side and the horizontal direction may be freely performed. Therefore, it is possible to hold the interval between the light emitting surface 142A and the one side surface 111 of the light guide plate 11, and maintain the luminance distribution to be described below.

The reflection sheet 12 is disposed so that one surface thereof faces the other surface of the light guide plate 11. The reflection sheet 12 is made of, for example, a white resin having excellent light reflecting properties, and has a function to reflect the light made incident on the light guide plate 11 from the light source 142 and return the reflected light to the emitting surface side of the light guide plate 11, as well as return the irregularly reflected light by the reflection dots 112, 112, ..., 112 to the emitting surface side of the light guide plate 11. In addition, one surface of the reflection sheet 12 may be applied with a paint having excellent light reflecting properties.

Meanwhile, the plate-shaped heat dissipation part 9, which releases heat generated in the light guide plate 11 and the reflection sheet 12, is disposed on the other side of the reflection sheet 12. The other surface of the reflection sheet 12 faces one surface of the heat dissipation part 9.

By having the above-described configuration, the television receiving apparatus 100 according to the embodiment of the present invention may cope with the rattling which may occur due to an increase in a size of a liquid crystal screen, variation in a design or the like.

Figure 6A:
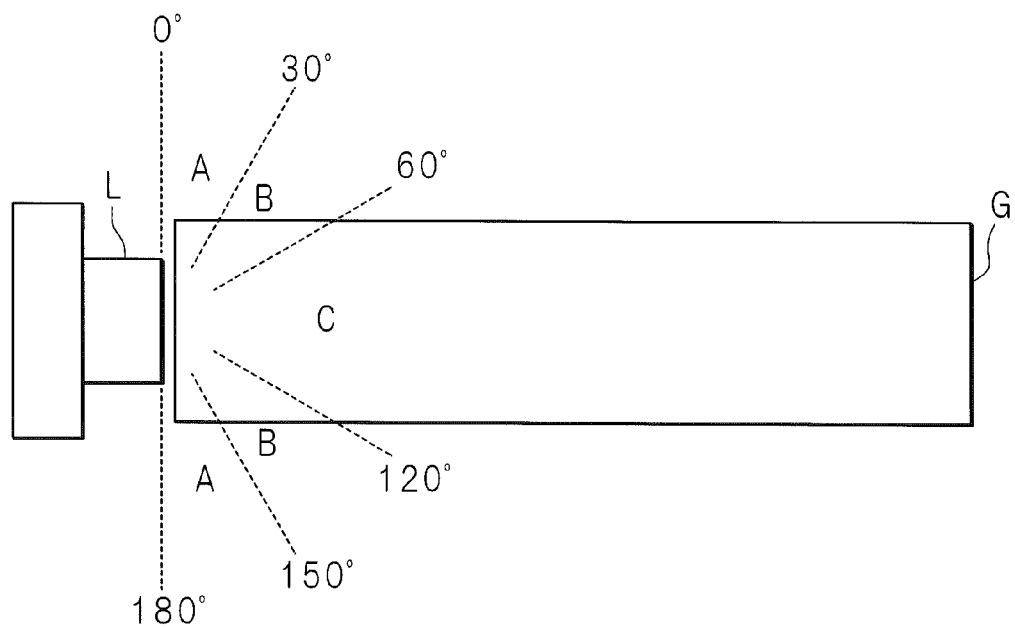
FIG. 6A is an explanatory view illustrating, when a light source and a light guide plate are located at a normal position, an incidence of light from the light source in the related art.
Figure 6B:
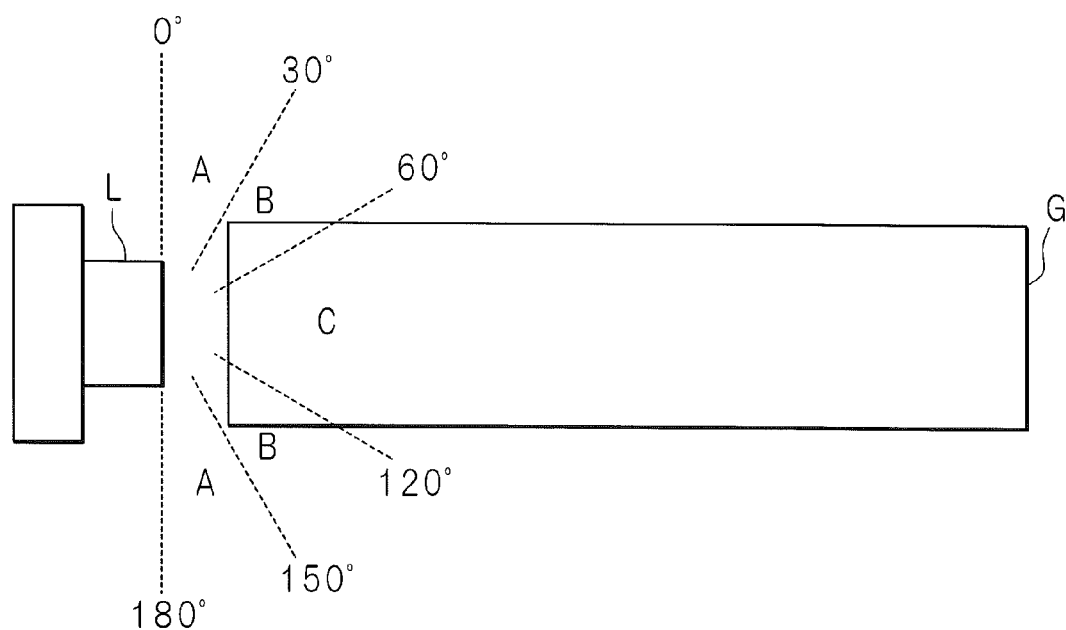
FIG. 6B is an explanatory view illustrating, when the light source and the light guide plate are apart from each other farther than the design, the incidence of light from the light source in the related art.

In the edge light type light source device such as the light source device 1 of the television receiving apparatus 100 according to the embodiment of the present invention, it is preferable that a light incident part (one side surface 111) of the light guide plate 11 comes close to the light source 142. The reason is that, as they are away from each other, the light from the light source 142 is no longer made incident on the light guide plate 11. As described in FIG. 6, because as the light source 142 and the light incident part of the light guide plate 11 are away from each other, the light emitting obliquely from the light source 142 is no longer coming into contact with the light incident part of the light guide plate 11. Such a problem appears when using the LEDs as a light source, as illustrated in FIG. 6.

In addition, for proximity between the light incident part (one side surface 111) of the light guide plate 11 and the light source 142, since an entire light flux amount is increased with coming closer to each other, it is preferable optically. However, when they come too close with each other, there are physical hazards such as physical collisions due to a thermal deformation, thermal expansion deformation, or the like in these members. So dimensional accuracy and accuracy of an assembly considering the thermal expansion are required.

Therefore, in the television receiving apparatus 100 according to the embodiment of the present invention, an interval of 0.1 mm to 1.0 mm is provided between the light emitting surface 142A of the light source 142 and the one side surface 111 of the light guide plate 11.

That is, as described above, the light guide plate 11 (one side surface 111) is configured in such a manner that, when actually using the television receiving apparatus 100, it is possible to hold the interval between the light source 142 on the lower side due to its own weight, and on the other side surface side excluding the one side surface 111, the light guide plate 11 may be freely expanded. Therefore, even if heat is applied to the light guide plate 11, it may be freely expanded while maintaining the interval.

Accordingly, the television receiving apparatus 100 does not require a heat dissipation mechanism and a complicated mechanism for the maintenance of the interval between the light guide plate 11 and the light source 142 and solving the problem due to the expansion, and may simply cope with the problem at a low cost.

Figure 4:
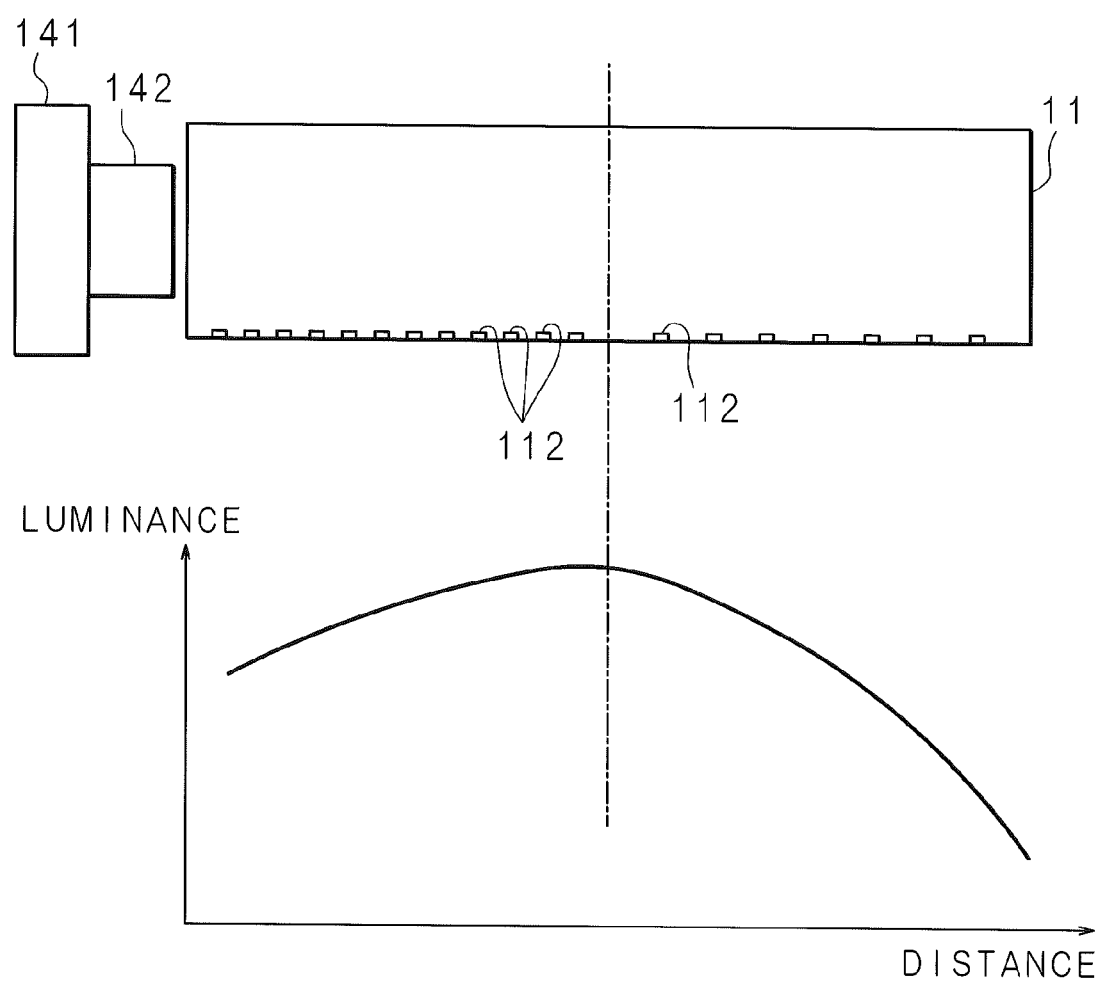
FIG. 4 is an explanatory view illustrating a luminance distribution in the light guide plate when using the television receiving apparatus according to the embodiment of the present invention.

In addition, the television receiving apparatus 100 according to the embodiment of the present invention is configured in such a manner that the luminance distribution in the light guide plate 11 becomes a distribution as illustrated in FIG. 4. FIG. 4 is an explanatory view illustrating the luminance distribution in the light guide plate 11 when using the television receiving apparatus 100 according to the embodiment of the present invention.

The television receiving apparatus 100 according to the embodiment of the present invention is configured in such a manner that the average luminance at the light source unit 14 side is higher than the average luminance at the far light source unit 14 side (the other side surface side), with respect to a center of the light guide plate 11 in the short-side direction thereof.

Specifically, when the average luminance at the light source unit 14 side is set "Yn", and the average luminance at the far light source unit 14 side is set "Yf", the light guide plate 11 is configured so as to have the Yn and the Yf which satisfy a relation of Formula 1 below therebetween.

$$1.1 < Yf < Yn < 1.5 Yf \quad (1)$$

The above-described configuration may be achieved, as described above, by appropriately controlling the diameters of the reflection dots 112, 112, ..., 112, and appropriately distributing the same so that the ratio occupied by the reflection dots 112, 112, ..., 112 at the light source unit 14 side on the other surface side of the light guide plate 11 is larger than the ratio occupied by the reflection dots 112, 112, ..., 112 at the far light source unit 14 side. Hereinafter, it will be described in detail.

Figure 5:
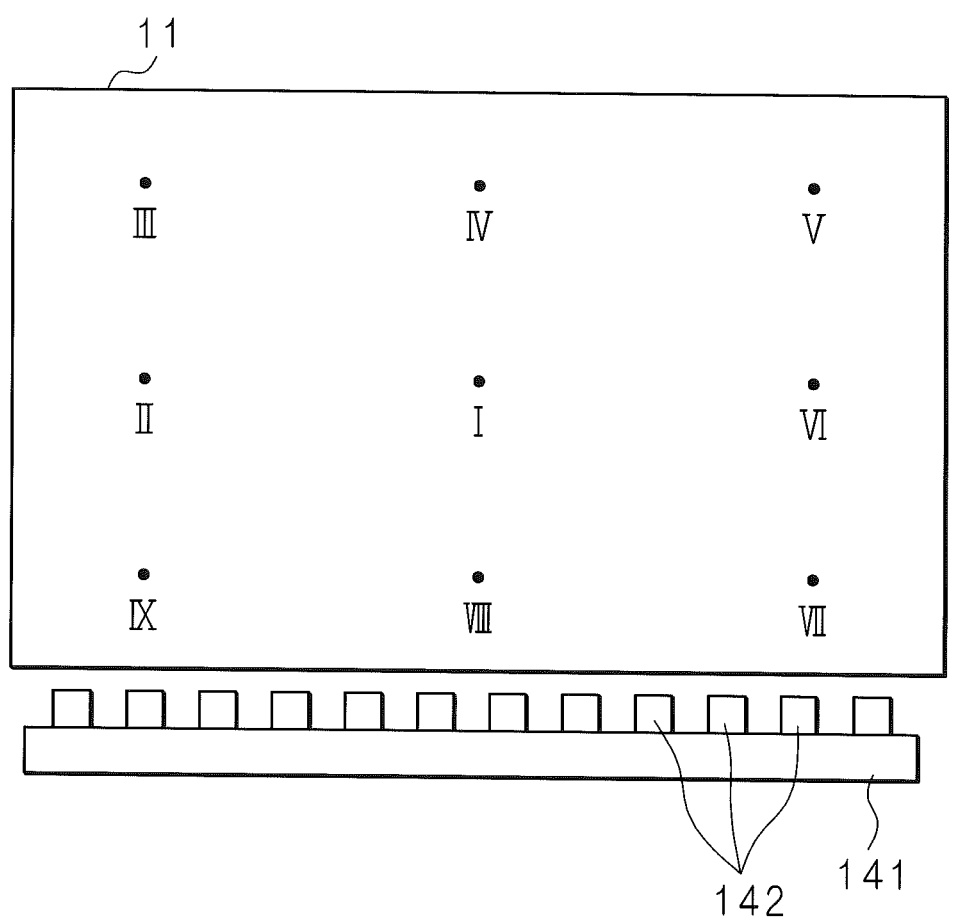
FIG. 5 is an explanatory view describing a basic performance generally required in a display apparatus.

FIG. 5 is an explanatory view describing a basic performance generally required in the display apparatus. In general, as a so-called basic performance in the display apparatus such as a television receiving apparatus, having at least 70% of uniformity is required. Herein, the uniformity is a ratio "min (of eight measurement points)/central luminance (%)" of the lowest luminance among eight points of II to IX to the highest luminance at a central point I, which are obtained by forming a matrix by defying the entire of the display screen top, bottom, left and right in the eight points of "II to IX," as illustrated in FIG. 5, and measuring the luminance of each point, and in addition thereto, measuring the luminance at the central point "I," and is defined by a lower limit value (The uniformity is represented by an inverse number in some cases, and in that case, it is defined by an upper limit value).

If the uniformity is low, it gives an impression of a display apparatus having a dark peripheral portion, which is not preferable as the display apparatus. In addition, if the uniformity is high, it gives an impression of being too flat. And in addition thereto, because a required central luminance is defined, the entire light flux amount to be input is increased, and an expensive optical member is added, which causes a problem of increased costs. As the general basic function, there is a relation between the lowest luminance and the highest luminance of min/max>70%, and the television receiving apparatus 100 according to the embodiment of the present invention satisfies the condition by appropriately distributing the reflection dots 112, 112, ..., 112, as described above.

It is most efficient that, among conditions satisfying the basic performance above-described, the distribution for minimizing the entire light flux amount is performed in such a way that, with the luminance of the central point as 100, the eight points near the central point are set to be the same as a defined value (for example, when the defined value is set to be 70, the luminance distribution is 70). However, since the basic performance is generally defined by the lower limit value, an addition is required when including the variation in the design.

The television receiving apparatus 100 according to the embodiment of the present invention copes with the addition by a simple and inexpensive configuration that increases only the average luminance of the light source unit 14 side, as described above, without equally adding to the whole of the display screen (light guide plate 11).

Specifically, in the upper two points (III and V) and the lower two points (IX and VII), the luminance at the lower two points is higher than the upper two points by a prescribed amount. The reason is that, in general, the luminance of the upper central point (IV) and the lower central point (VIII) is often higher than the end parts.

That is, the average luminance of the light source unit 14 side referred to herein may be an average of the upper three points (III, IV and V), and more substantially, may be the average luminance of the lower two points (IX and VII). In the present invention, the average luminance of the lower two points (IX and VII) is larger than the average luminance of the upper two points (III and V).

As described above, the light guide plate 11 is configured in such a way that a distance between the light guide plate 11 and the light source 142 is constantly maintained by using its own weight. However, since the light guide plate 11 is configured so as to be freely expanded at the opposite side which is opposite to the one side surface 111 (hereinafter, referred to as a side opposite to the light source), a gap therebetween may be freely moved by the light guide plate 11 in assembly, and there is a possibility that the light guide plate 11 moves to the side opposite to the light source depending on a storage method.

In that case, as described above, a light amount entering to the light guide plate 11 is reduced, and the uniformity of the light guide plate 11 is also changed following the reduction. Commonly, as a countermeasure therefore, a measure is taken for satisfying the lower limit value of the uniformity by uniformly increasing the entire luminance of the whole of eight points of the light guide plate 11 by adding the variation thereof. However, the present invention pays attention that the interval (0.1 mm to 1.0 mm) between the light emitting surface 142A and the one side surface 111 of the light guide plate 11 is maintained, and the movement of the light guide plate 11 to the light source 142 side is limited, while allowing it to move to only the side opposite to the light source.

As the light guide plate 11 is separated from the light source 142 side, a reduction rate of light emitting from the light guide plate 11 at the far light source unit 14 side of the light guide plate 11 is more gradually decreased than the light source unit 14 side.

The principle is due to light distribution characteristics of the light source 142, as illustrated in FIG. 6, and among the incident light to be used, the ratio occupied by the light emitting obliquely from the light source 142 (light of A in FIG. 6) is high at the light source 142 side of the light guide plate 11, and the ratio occupied by a linear light (light of C in FIG. 6) is high at the far light source unit 14 side of the light guide plate 11.

As described above, because emitting angles of the light to be used are different from each other, as the light guide plate 11 is separated from the light source 142, a reduction in light at the far light source unit 14 side of the light guide plate 11 is small, but a reduction in light at the light source 142 side of the light guide plate 11 becomes larger.

In this regard, when the light guide plate 11 is separated from the light source 142 due to assembling, or the like, the reduction rate of light at the light source 142 side is larger than the central part of the light guide plate 11 in the short-side direction thereof, and the uniformity becomes smaller than when being closer to the light source 142 side. In addition, it should be noted that, since the reduction rate of light at the far light source unit 14 side is smaller than the central part, the uniformity thereof is higher than when being closer to the light source 142 side.

That is, as a design value when the light source 142 and the light guide plate 11 come closer to each other, the luminance on the light source 142 side of the light guide plate 11 is set to be a, the luminance of the central part of the light guide plate 11 is set to be b, and the luminance on the far light source unit 14 side of the light guide plate 11 is set to be c. In a common design, the b, which is the luminance of the central part, is the basic performance as an absolute value. In addition, the uniformity is the basic performance as a relation of (the smaller of a and c)/b. (Actually, although the numerator in the above relation is the minimum of the surrounding eight points, it will be described using the upper c and the lower a in a pseudo manner.)

As described above, the luminance distribution in the light guide plate is determined depending on the disposition method of a diameter of the reflection dots 112, 112, ..., 112, however, in association with the a, b, and c respectively, the b to be the basic performance is affected by the c and determined in relation thereto, and the c is affected by the a and b and determined in relation thereto. In addition, it is preferable in terms of the design that the b is set so as to be the maximum value within a range satisfying the uniformity.

From the above description, in terms of the design, when the uniformity is set to the defined value of 70, it is ideal to have a relation of "a=c=b×0.7.".

When the light flux amount is constant (i.e., a+b+c=Const), a relation may be obtained as below:

$b = \text{Const} - (a+b)$, and $b\text{max} = \text{Const} - 2a \quad (a = 0.7 \times b)$.

Herein, due to a tolerance of each member, and variation in assembly accuracy, the luminance corresponding thereto when it is larger than the design value is set to a1, b1 and c1, respectively.

In the case of this design, when the light guide plate 11 is separated from the light source 142, a relation of a>>a1, b>b1, and c≈c1 is obtained, and the luminance and the uniformity of the central part are represented by b1 and a1/b1 (or, c1/b1), respectively. Therefore, if considering the results of a>>a1, b>b1, and c≈c1, and when designing as a relation of a=c=b×0.7, a relation of a1/b1>>0.7c1/b1>0.7 is obtained, which departs from the basic performance.

Thus, from the relation of a1/b1>>0.7c1/b1>0.7, by adding a design margin thereto, a relation may be obtained as below:

$a = b \times 0.7 + \alpha$ (margin);

and $1.1c < a < 1.5c$.

That is, due to a relation of $1.1Yf < Yn < 1.5Yf$, it is possible to make a distribution resistant to the tolerance of each member and the variation in assembly accuracy and capable of effectively using the light flux amount.

From the above description, the entire luminance of the eight points near a defined point is designed in such a way that only the luminance on the light source 142 side of the light guide plate 11 is increased without uniformly increasing the whole luminance of the display screen (light guide plate 11), such that it is possible to produce the module which is resistant to inclination and rattling in a power saving manner and at a low cost.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device which includes a light guide plate configured to emit light entering from a first side surface of the light guide plate, to which the light enters, through a light emitting surface of the light guide plate,
   wherein the light guide plate is configured so that an average luminance on a side of the first side surface is higher than that on a side of a second side surface opposite to the first side surface, with respect to a center between the first side surface and the second side surface.

2. The light source device according to claim 1, wherein the light guide plate is configured to have an average luminance Yn on the side of the first side surface and an average luminance Yf on the side of the second side surface which satisfy a relation of Formula 1 below:

$$1.1Yf < Yn < 1.5Yf \qquad (1).$$

3. The light source device according to claim 1,
   wherein the light guide plate has reflection dots which are provided on an opposite surface opposite to the light emitting surface of the light guide plate to irregularly reflect the light entering from the first side surface, and
   the reflection dots are provided so that a ratio of the reflection dots on the opposite surface is larger on the side of the first side surface than the side of the second side surface, with respect to the center.

4. The light source device according to claim 1, comprising a light source disposed near the first side surface of the light guide plate,
   wherein an interval of 0.1 mm to 1.0 mm is provided between the light source and the first side surface of the light guide plate.

5. A display apparatus comprising:
   the light source device according to claim 1; and
   a display panel which is provided near the light emitting surface of the light guide plate of the light source device, and configured to display an image using light entering to the display panel through the light guide plate.

* * * * *